(12) United States Patent
Cornet et al.

(10) Patent No.: US 11,261,755 B2
(45) Date of Patent: Mar. 1, 2022

(54) HYDRAULIC SYSTEM

(71) Applicant: SAFRAN AERO BOOSTERS SA, Herstal (BE)

(72) Inventors: Albert Cornet, Herstal (BE); Nicolas Raimarckers, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 78 days.

(21) Appl. No.: 16/629,418

(22) PCT Filed: Apr. 18, 2019

(86) PCT No.: PCT/EP2019/060058
§ 371 (c)(1),
(2) Date: Jan. 8, 2020

(87) PCT Pub. No.: WO2019/206795
PCT Pub. Date: Oct. 31, 2019

(65) Prior Publication Data
US 2020/0149430 A1 May 14, 2020

(30) Foreign Application Priority Data
Apr. 23, 2018 (BE) .................................. 2018/5272

(51) Int. Cl.
*F01D 25/20* (2006.01)
*F02C 7/14* (2006.01)
(Continued)

(52) U.S. Cl.
CPC ................ *F01D 25/20* (2013.01); *F02C 7/06* (2013.01); *F02C 7/047* (2013.01); *F02C 7/14* (2013.01);
(Continued)

(58) Field of Classification Search
CPC ......... H01M 8/04358; H01M 8/04029; H01M 10/663; H01M 2250/20; F05D 2260/98;
(Continued)

(56) References Cited

U.S. PATENT DOCUMENTS 9,843,060 B2 * 12/2017 Mayr ................ H01M 8/04303
2007/0246302 A1 * 10/2007 Bell ........................ H02P 29/62
184/6.11
2007/0248861 A1 * 10/2007 Hoshi ................. H01M 16/006
429/435

FOREIGN PATENT DOCUMENTS

EP 2743477 A1 6/2014
EP 2801707 A1 11/2014
(Continued)

OTHER PUBLICATIONS

International Search Report dated Sep. 17, 2019 for Parent PCT Appl. No. PCT/EP2019/060058.

*Primary Examiner* — Stephanie Sebasco Cheng
(74) *Attorney, Agent, or Firm* — James E. Walton

(57) ABSTRACT

System for an aircraft, the system comprising: a turbine engine (2) with a hydraulic lubrication circuit (30); and a fuel cell (28) with a hydraulic circuit (40) for setting and maintaining the operating temperature of the fuel cell (28); wherein the hydraulic lubrication circuit (30) and the hydraulic circuit (40) form a single and common oil circuit and the oil circuit comprises a pump (50) with a heating element integrated in the pump for heating the oil.
The pump may be an electric pump with an electric motor, wherein the electric motor comprises a coil fed with DC current forming a heating element for heating the oil.
The pump may comprise a body and the heating element may be an electric resistor embedded into the body of the pump and in direct contact with the oil.

11 Claims, 7 Drawing Sheets

(51) Int. Cl.
*F02C 7/06* (2006.01)
*F02C 7/047* (2006.01)

(52) U.S. Cl.
CPC .... *F05D 2220/323* (2013.01); *F05D 2220/36* (2013.01); *F05D 2230/60* (2013.01); *F05D 2240/50* (2013.01); *F05D 2260/213* (2013.01); *F05D 2260/98* (2013.01)

(58) Field of Classification Search
CPC ........ F01D 25/18; F01D 25/20; F04D 29/588; F04D 29/5893; F04D 29/06; F04D 29/061; F04D 29/586; F04D 29/5866; F04D 29/5873; F02C 7/12–185; F04B 53/08
See application file for complete search history.

(56) References Cited

FOREIGN PATENT DOCUMENTS

| | | | |
|---|---|---|---|
| EP | 3239479 | A1 | 11/2017 |
| WO | 2015050579 | A2 | 4/2015 |

\* cited by examiner

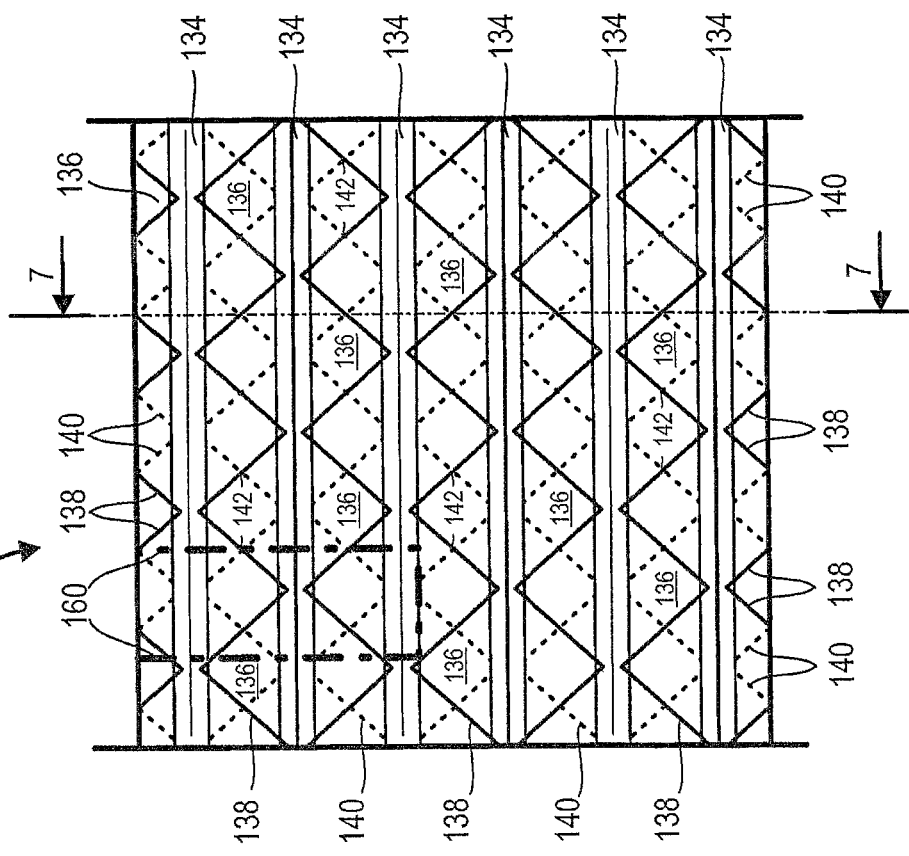

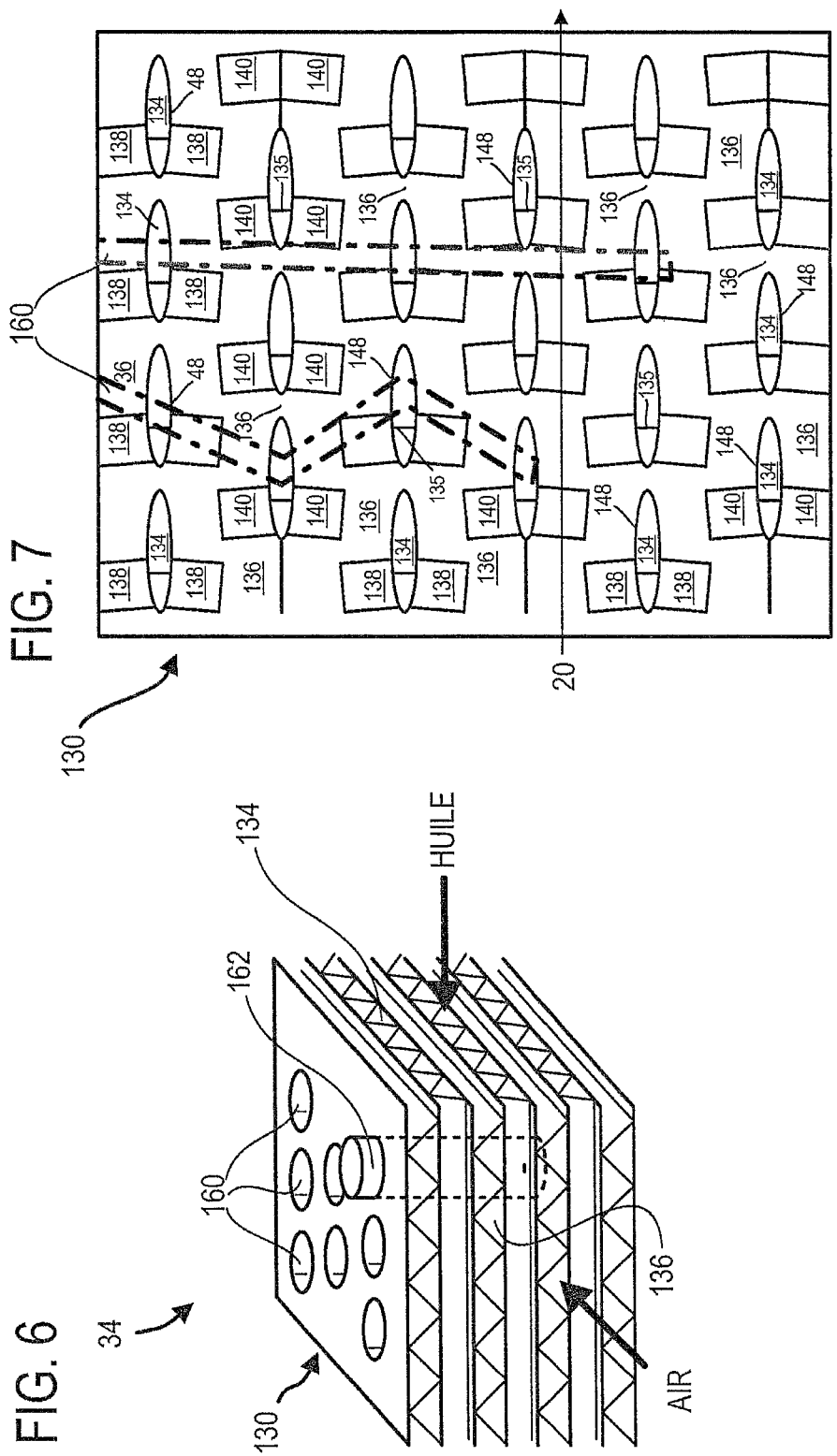

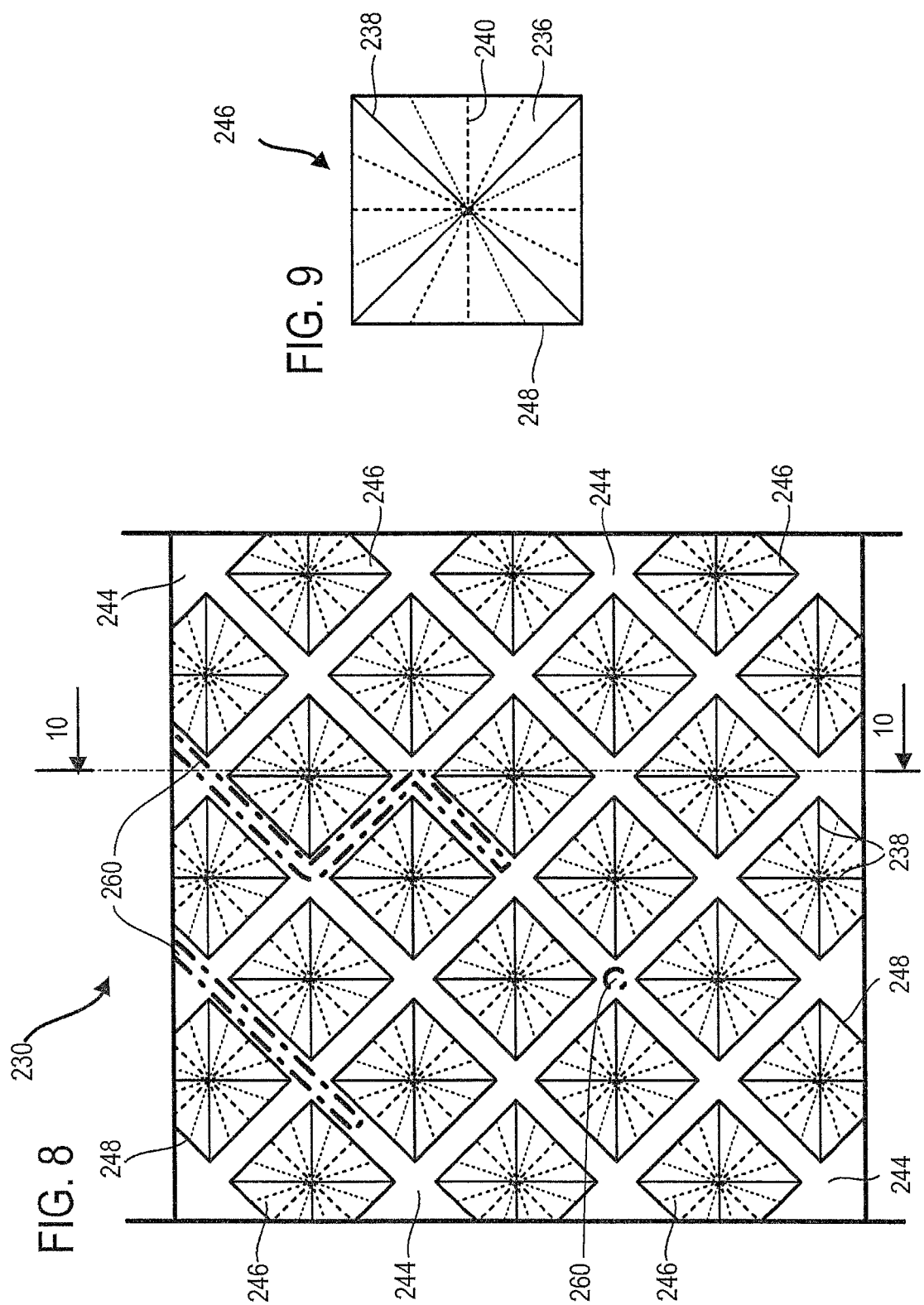

HYDRAULIC SYSTEM

TECHNICAL FIELD

The invention relates to the field of lubrication of a turbine engine. More specifically, the invention relates to the management of oil in an aircraft system.

BACKGROUND ART

Some aircrafts may include a fuel cell to power some equipment or contribute to fuel savings by supplementing the power needs of turbojet engines. The fuel cell, usually integrated into the fuselage, has its own oil circuit to preserve the stack of electrodes. The oil keeps the fuel cell at an optimum operating temperature, for example between 20° C. and 150° C. However, at a too low temperature the oil can freeze and clot and thus the pump cannot convey the oil, thus preventing the fuel cell from being started safely. For that reason, some pumps are oversized to force the pumping of the oil even when frozen. This means that the pump is heavier and that the mechanical stress applied to the components (pipes, valves, etc.) of the hydraulic circuit is greater. An alternative solution is to provide a dedicated oil heating system to the fuel cell.

On the other side of the spectrum, some kinds of oil operating at high temperatures (above 200° C.) allow a good performance of heat exchangers, and therefore make possible smaller exchangers. These oils include additives that make them chemically aggressive for the hydraulic system. It is therefore difficult to balance the weight of the heating system or of the oversized pump by gaining weight on the heat exchangers.

As for the turbojet engine of the aircraft, it also includes a hydraulic circuit, in particular for lubricating the moving parts so as to limit their wear. In some cases, it is used to cool some mechanical parts; which results in its temperature being raised beyond 200° C. In addition, when the oil contributes to the de-icing of the inlet nozzle of the compressor and the nacelle, it is exposed to temperatures below −40° C., which requires the oil to have a wide working temperature range. Incidentally, when compressed, this oil can also be used for actuating a cylinder. Finally, the oil contributes to the monitoring of wear because it carries particles released by moving parts and these particles can be picked up by magnetic elements.

In an aircraft equipped with a turbojet engine and a fuel cell, there are therefore two separate hydraulic circuits, each of which is particularly bulky and heavy. There is a need for heating oil on the one hand and for cooling oil on the other hand. This represents many parts, sometimes redundant and results in a hydraulic assembly that is bulky, expensive and heavy.

SUMMARY OF THE INVENTION

Technical Problem

The object of the invention is to overcome at least one of the drawbacks of the prior art. More specifically, the invention aims to optimize the lubrication of an aircraft and in particular to solve the problem posed by the oil frozen at low temperature. The invention also aims to provide a compact solution, simple, lightweight, economical, reliable, easy to produce, and of convenient maintenance.

Technical Solution

The invention relates to a system for an aircraft, comprising: a turbojet engine provided with a hydraulic lubrication circuit and/or a fuel cell provided with a hydraulic circuit for setting and maintaining the operating temperature; remarkable in that at least one of the circuits comprises an electric circulating pump incorporating a heating element to heat the oil.

Such a system makes it possible to make the oil temperature raise to feed it to the fuel cell without the oil freezing.

The hydraulic lubrication circuit of the turbojet engine lubricates and cools mechanical components such as bearings, the gearbox or electrical equipment.

The fuel cell, often designed to be in the aircraft fuselage, and therefore remote from the turbojet engine comprises a hydraulic circuit for setting and maintaining its operating temperature.

The heating elements of the electric pump may be elements that heat actively the pump or due to the proximity of the pump to hot elements (thermally conductive wall), or may be elements which rise in temperature (resistance, coil) thanks to an external source of energy.

The solution of the invention is therefore the integration of several functions (pumping, heat exchange, pressure regulation) to minimize the weight and bulkiness of the hydraulic system as a whole.

According to preferred embodiments of the invention, the system can comprise one or more of the following features, taken separately or according to all the possible technical combinations:

- the system comprises the turbojet engine and the fuel cell, the lubrication circuit of the turbojet engine and the circuit for setting and maintaining the temperature of the fuel cell forming a single common oil circuit. Thus, the two circuits can share at least one common tank, and the oil that is cooled or heated in the turbojet can circulate in contact with the fuel cell to cool or reheat the temperature;
- the electric pump comprises an electric motor provided with a coil and the coil is supplied with direct current so that the coil heats up, the direct current preferably being above the rated operating value of the coil;
- the pump comprises a body and the heating element is an electrical resistor embedded in the body of the pump to be in direct contact with the oil;
- the pump comprises a body and the heating element is the body of the pump which is made of thermal conductive material and contains at least one of the following elements: aluminum, silver, copper, zinc. The body may be composed of an alloy of one or more of these elements. Thus, the oil can be heated by simple conduction of the body of the pump because the pump is positioned near a heat source. The heat source may be for example an electrical module of the turbojet, or a mechanical member thereof;
- the circuit comprising the pump also comprises a tank for the oil, the pump being integrated or in direct contact with the tank, so that its heating element heats the oil which is in the tank. The tank can be provided with a deaerator to remove air from the oil;
- the circuit comprises a lubrication module positioned thermally in contact with the tank. A lubrication module may include multiple pumps, temperature, pressure, or flow sensors, one enclosure recovery function, and associated electronic control. By "thermal contact" is meant that the lubricating module can be linked to the tank to transmit energy to it by thermal conduction;
- the tank, the pump and the heating element, as well as possibly the lubrication module, make up a modular assembly wrapped in a casing. It is therefore possible to completely surround the tank, the pump and the heating element, in the form of a module of which only input and oil outlet connectors are accessible during assembly of the turbojet engine;

The casing is shaped to be introduced into a cavity of an aircraft wing. Alternatively, the casing of this module may be curved or may form an annular portion to be introduced into the turbojet engine;

At least one of the circuits comprises a heating device for heating by induction a cavity containing oil. The induction heating device may be a coil near and/or surrounding the tank whose walls are ferromagnetic;

the lubricating circuit of the turbojet comprises a portion which forms an exchanger with the air of the bleed of the turbojet engine to heat the oil. This hot air that can be discharged at the compressor outlet and upstream of the combustion chamber can indeed heat the oil;

the lubricating circuit of the turbojet comprises a portion which forms an exchanger with the ambient air or the by-pass air of the turbojet engine to cool the oil;

the circuit comprises valves and pumps and a control device for actuating the valves and pumps for circulating the oil in one and/or the other of the exchangers as a function of a measured oil temperature and a target oil temperature. If the temperature is higher than the optimum value range, the oil will be conducted in the bypass cooling exchanger. If the temperature is below the target range, it will be conducted in the bleed air exchanger.

The invention also relates to a method for managing the oil in a system as described above.

According to this method, the temperature of the oil is measured and the oil is heated if its temperature is below a first threshold temperature, in particular 20° C.

According to a preferred embodiment of the method, the energy requirement of the aircraft or the turbojet engine is evaluated, and the oil is heated only if the energy requirement of the aircraft is such that the fuel cell must be put into operation.

According to a preferred embodiment, the oil is cooled if its temperature is above a second threshold temperature, in particular 150° C.

According to a preferred embodiment, the electric pump comprises an electric motor provided with a coil and the coil is supplied with DC current in order to heat it, the direct current preferably being above the rated operating value of the coil.

In a preferred embodiment, the coil is fed with a DC current maintained between 110 and 150% of its rated value as long as the oil is below the first threshold value. This value range is used to generate heat without damaging the pump.

According to a preferred embodiment, the system comprises an electrical circuit for supplying the pump which is such that the electric pump is powered exclusively by the fuel cell, when the latter is in operation. Such an electrical circuit may include switches controlled to select the power source of the pump. When the fuel cell is off, it is naturally necessary to supply the electric pump by other auxiliary means.

The problem posed by the cold oil which freezes and clots in the hydraulic circuit is also solved by a turbomachine air/oil heat exchanger comprising a matrix and heating elements, the matrix comprising: a passage for the flow of air; a network in which the oil circulates and which supports at least two successive cooling fins according to the flow of air; the matrix further comprising housings for accommodating said heating elements.

Indeed, the fact of introducing the heating elements directly into the matrix of the heat exchanger is a compact and inexpensive solution to ensure the proper functioning of the hydraulic circuit when the oil is cold.

According to preferred embodiments of the invention, the system can comprise one or more of the following features, taken separately or according to all the possible technical combinations:

the fins extend in respective main directions that is inclined with respect to each other;

the housing comprises a wall which cooperates with the oil in the network;

the housing is straight tubular or zig-zag;

the heating elements are heating rods, electrical resistances, and/or heating films;

The invention also relates to a turbomachine, in particular a turbojet comprising a heat exchanger with a matrix, bearings, and a gearbox driving a fan, remarkable in that the exchanger complies with one of the embodiments outlined above.

According to particular embodiments, the matrix may comprise one or more of the following features, taken separately or according to all the possible technical combinations:

The main directions of the successive fins are inclined relative to each other by at least 10°, or at least 45°;

the air flows through the matrix in a general direction of flow;

between the two successive fins the matrix comprises a passage oriented transversely with respect to said general sense;

the successive fins form successive crosses according to the flow of air, said successive crosses being optionally rotated relative to each other;

the matrix comprises several sets of successive fins arranged in several successive planes following the flow of air, said planes possibly being parallel;

the successive fins extend from an area of the network, in projection against a plane perpendicular to the flow of air, the successive fins intersect at a distance from said network area;

the successive fins are contiguous or spaced apart from each other in the direction of flow of air;

the network comprises a plurality of tubes, possibly parallel to each other;

the tubes have elliptical, drop-shaped, or diamond-shaped cross-sections;

the network comprises a wall separating the air from the oil, the successive fins extending from said wall;

the network comprises a mesh;

the mesh has a profile cross-section along to the direction of flow of the air;

the mesh defines channels for the flow of air, the channels possibly being of quadrangular section;

the matrix is adapted for a heat exchange between a liquid and a gas, in particular a gas flow passing through a turbojet engine;

the successive fins comprise main portions according to which the main directions are arranged, the main directions of the main portions being inclined with respect to each other;

the main directions are inclined relative to one another by at least 5°, or by at least 20°, or 90°;

the successive fins comprise junctions on the network which are offset transversely with respect to the flow of air;

the tubes describe at least one alignment or at least two alignments, in particular transversely with respect to the flow of air.

the two successive fins connect adjacent tubes, possibly intersecting in the space between said tubes;

each fin is solid (not hollow), and/or forms a flat wafer;

each fin comprises two opposite ends which are both joined to the network;

the thickness of the successive fins is between 0.10 mm and 0.50 mm; or between 0.30 mm and 0.40 mm; and or less than the thickness of the wall;

the successive fins describe at least one interlacing, preferably several intersections;

the intersections are separated from each other, or have a continuity of material, according to the flow of air;

the tubes are spaced according to the flow of air and/or transverse to the flow of air;

the mesh extends over the entire length and/or the entire width and/or the height of the matrix;

the network comprises internal protuberances in contact with the oil;

the matrix comprises a helical passage formed between the fins, possibly several coaxial helical passages which are formed between the fins. Optionally the coaxial helical passages have the same pitch, and/or the same radius.

According to a preferred embodiment of the invention, the heat exchanger has a generally arcuate shape; the tubes possibly being oriented radially.

The invention also relates to a method of producing a heat exchanger matrix for exchanging heat between air and oil, the matrix comprising: a passage for the flow of air; a network extending in the passage and in which the oil flows; the method comprising the steps of: (a) designing the heat exchanger with its matrix; (b) producing the matrix by additive manufacturing in a printing direction; wherein step (b) comprises the production of fins extending in main directions which are inclined with respect to the printing direction.

According to a preferred embodiment of the invention, the fins are arranged in planes inclined with respect to the printing direction of an angle β between 20° and 60°, optionally between 30° and 50°.

According to a preferred embodiment of the invention, step (b) comprises producing tubes inclined relative to the printing direction by an angle of between 20° and 60°, possibly between 30° and 50°.

According to a preferred embodiment of the invention, the step (b) comprises producing housing having walls that cooperate with the inner space of the tubes.

In general, the preferred embodiments of each object of the invention are also applicable to the other objects of the invention. Each object of the invention is combinable with the other objects, and the objects of the invention are also combinable with the embodiments of the description, which in addition are combinable with each other, according to all possible technical combinations, unless otherwise mentioned. In particular, the heating or cooling modes of the oil can be manifold and can be controlled independently. To that end, the oil paths are shunted or open to oil passage, through valves and control means provided for this purpose. Some heating or cooling modes may be more efficient than others, depending on the difference between the measured temperature and the target temperature.

Benefits

The fact of integrating the heating element into the pump makes it possible to reduce the bulkiness and space taken by the hydraulic system. Depending on the operation of the fuel cell, it may be required to cool down or heat up the oil, and this can be conveniently done by air (cold) or by turbine engine components (hot). A heating element dedicated to the fuel cell only is not required anymore.

BRIEF DESCRIPTION OF THE DRAWINGS

FIG. 4 outlines a front view of a heat exchanger according to the invention.

FIG. 5 illustrates a front view of a matrix of the heat exchanger according to a first embodiment of the invention.

FIG. 6 is an isometric view of a heat exchanger according to the invention.

FIG. 7 is a section of the matrix along the axis 7-7 drawn in FIG. 5.

FIG. 8 illustrates a front view of a heat exchanger matrix according to a second embodiment of the invention.

FIG. 9 shows an enlargement of a typical channel of FIG. 8.

DETAILED DESCRIPTION OF A PREFERRED EMBODIMENT

In the following description, the terms "internal" and "external" refer to a positioning relative to the axis of rotation of an axial turbomachine. The axial direction corresponds to the direction along the axis of rotation of the turbomachine. The radial direction is perpendicular to the axis of rotation. Upstream and downstream are in reference to the main flow direction of the flow in the turbomachine.

Figure 1:
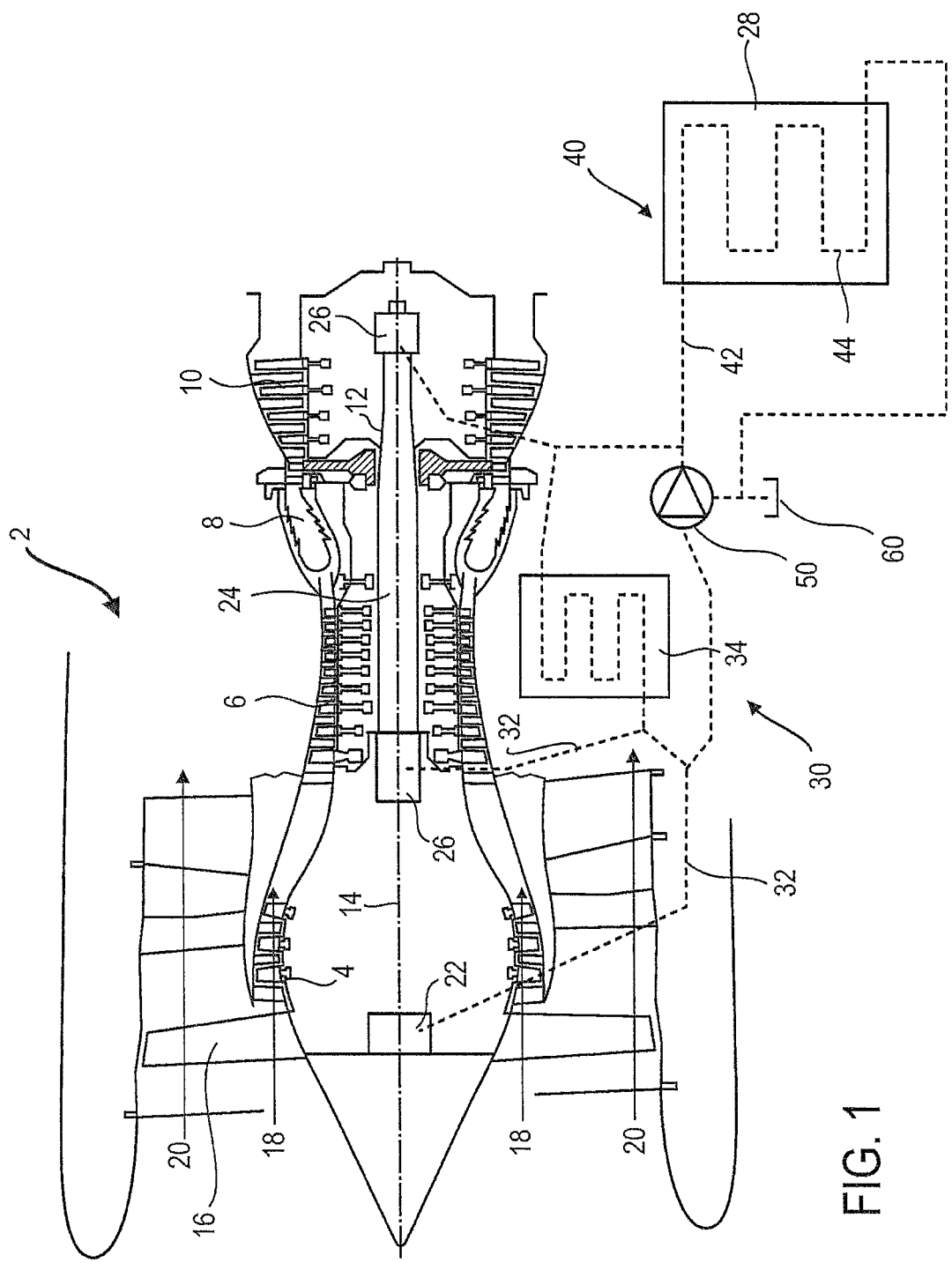
FIG. 1 shows a system according to the invention.

FIG. 1 is a simplified representation of an axial turbomachine 2. This is a double-flow turbojet engine. The turbojet engine 2 comprises a first compression level, called a low-pressure compressor 4, a second compression level, called a high-pressure compressor 6, a combustion chamber 8 and one or more levels of turbines 10. In operation, the mechanical power that the turbine 10 transmits to the rotor 12 sets in motion the two compressors 4 and 6. The latter comprise several rows of rotor blades associated with rows of stator blades. The rotation of the rotor about its axis of rotation 14 thus makes it possible to generate an air flow and to compress it progressively until it reaches the combustion chamber 8. A fan 16 is coupled to the rotor 12 and generates a flow of air which splits into a primary flow 18 passing through the various levels of the turbomachine mentioned above, and into a secondary flow 20 passing through an annular duct. (partially shown) along the engine to then join the primary flow at the turbine outlet.

Reducing means, such as an epicyclic reduction gear 22, can reduce the speed of rotation of the fan and/or the low-pressure compressor relative to the associated turbine. The secondary flow can be accelerated so as to generate a thrust reaction necessary for the flight of an aircraft. The primary 18 and secondary 20 air-flows are coaxial to each other and fitted into one another. They are channeled by the casing of the turbomachine and/or by ferrules.

The rotor 12 comprises a transmission shaft 24 mounted on the housing by means of two bearings 26.

FIG. 1 also very schematically shows a fuel cell 28. The fuel cell 28 supplies electricity to some engine components or auxiliary equipment of the aircraft.

In order to lubricate the rotating elements of the turbojet engine 2, a lubrication circuit 30 is provided. This circuit 30 comprises ducts 32 for conveying the oil to the turbojet engine components that need lubrication, such as in particular the gearbox 22 and the bearings 26. A heat exchanger 34 may be provided to regulate the temperature of the oil in the lubrication oil circuit 30. The exchanger 34 can be positioned in the secondary flow 20 to cool the oil. Alternatively, or in addition, an exchanger 34 may also be provided downstream of the bleed valves, to heat the oil. When both types of heat exchanger (cold and hot) are provided, valves and an adequate control system make it possible to pass the oil rather in one of the exchangers than in the other, in order to maintain the oil at a temperature desired. By adapting the flow rate or the passage time in one and/or the other of the exchangers, the temperature can be regulated precisely.

The system also comprises a hydraulic circuit 40. This circuit 40 makes it possible to ensure proper operation of the fuel cell 28. Duct 42 and a heat exchanger 44 enable the oil to be conveyed to the fuel cell 28.

The two circuits 30, 40 can form a single common oil circuit. Thus, the same oil can travel through both circuits: A tank 60 common to the two circuits and at least one pump 50 provide oil flow in both circuits.

It is implicit that the circuits comprise all the devices making it possible to control the temperature, the pressure and the flow rate in order to obtain optimum operation of the fuel cell 28 and the turbojet engine 2 (sensors, valves, booster, flow reducer, etc.).

The tank 60 may be attached to the nacelle of the turbomachine 2, or to a compressor housing. It is optionally attached to an intermediate casing. The tank 60 can be placed between two annular walls guiding concentric flows; for example the secondary flow 20 and the flow surrounding the turbomachine 2, or between the primary flow 18 and the secondary flow 20. In order to increase its usable volume, the tank 60 is essentially elongated while following a generally curved shape. This curvature allows implantation between two curved and close partitions. The tank 60 may in particular be close to a hot source, its temperature can reach 100° C.

To prevent the oil from freezing due to the low temperatures, the tank 60 can be heated by the exchanger 34 or by heating elements of the pump 50.

Figure 3:
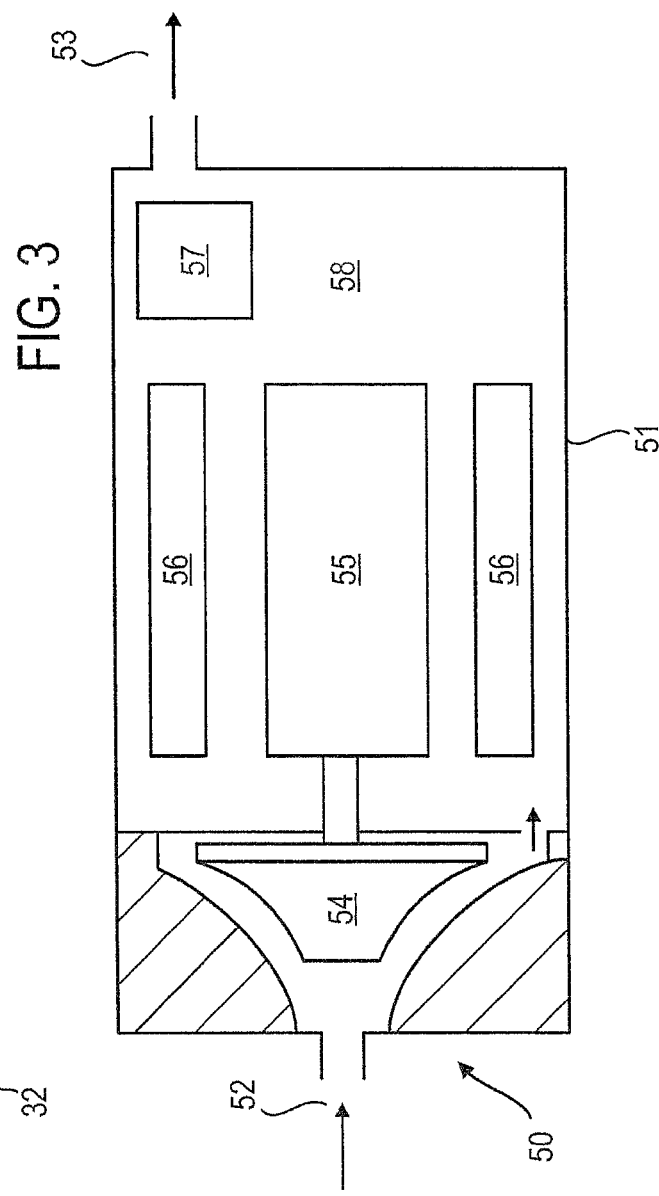
FIG. 3 shows an electric pump for a system according to the invention.

The heating elements of the pump 50 may be an electrical resistance embedded in the pump, the heating elements may otherwise be the coil of the pump supplied with direct current higher than the rated value, or may be contact surfaces of the pump body with the oil which are thermally conductive (see FIG. 3).

Figure 2:
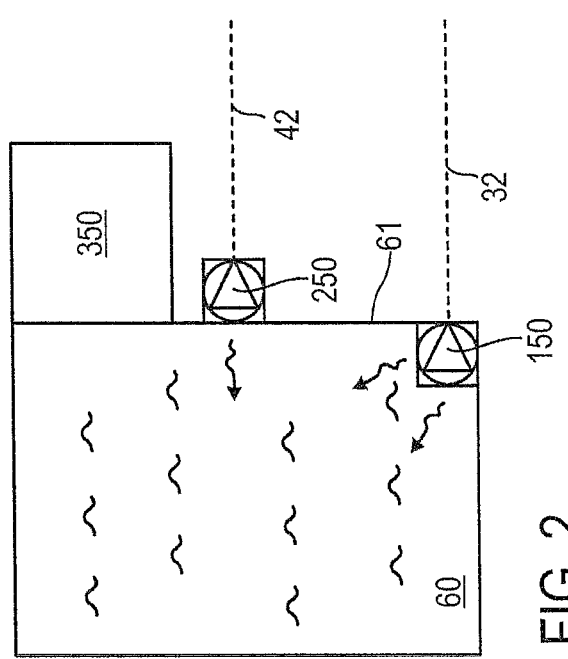
FIG. 2 illustrates a tank for a system according to the invention.

FIG. 2 shows a subassembly of the hydraulic circuit. Two pumps 150, 250 are shown to illustrate examples of possible positions of the pumps. The pump 150 is directly integrated with the tank 60. By thermal conduction in the tank (see the arrows in FIG. 2), the oil can be heated from the heating element of the pump 150. The pump 250 is placed directly in contact with the pump. A thermally conductive wall 61 of the tank 60. The pump 250 may for example also be in contact with a device that releases heat (electronic card, mechanical component, etc.) and thus serve as a thermal bridge to bring heat to the oil in the tank 60.

The subassembly may also contain a lubricating module 350. This consists of a module that may comprise one or more pumps, one or more sensors, a control electronics, etc. The heat released by the various components of the lubricating module 350 can be transmitted to the tank oil via the thermally conductive wall 61.

FIG. 3 represents a schematic example of an electric pump 50. The pump comprises a body 51 whose walls may be made of thermally conductive material. The oil is sucked through the inlet 52 and is discharged through the outlet 53. An impeller 54 rotates to suck the oil. The impeller is secured to a rotor 55 rotated by the electromagnetic field created by a stator 56.

The pump may have heating elements 57 in the form of heating module (s) which may comprise resistors or any other heating device.

The heating elements 57 are arranged in a cavity 58 of the pump which is travelled by the oil.

The oil can also come into contact with the coil of the stator 56 which, when it is supplied with direct current higher than the rated operating value, produces heat. The pump 50 may include any means suitable for its proper functioning (sensors, pressure relief valves, purge valves, etc.).

The pump 50 is only a schematic illustration of an electric pump that can be used in the system according to the invention. The skilled person could adapt the teaching of FIG. 3 to different types or forms of pump.

FIG. 4 shows a plan view of a heat exchanger 34 such as that shown in FIG. 1. The heat exchanger 34 has a generally arcuate shape. It matches an annular casing 128 of the turbomachine. It is crossed by the air of the secondary flow, and receives oil. It comprises a matrix 130 disposed between two collectors 132 closing its ends and collecting the oil. The exchanger may be hybrid and comprise both types of matrices described below.

FIG. 5 outlines a front view of a matrix 130 of heat exchanger according to the first embodiment of the invention. The matrix 130 may correspond to the one represented in FIG. 4.

The matrix 130 has a passage allowing the air to flow right through the matrix 130. The flow of air can be carried out in a general direction, perpendicular to the figure. The passage can usually form a corridor; possibly of variable external contour. In order to allow heat exchange, an oil receiving network is arranged in the bushing. The network may comprise a series of tubes 134. The various tubes 134 may provide passages 136 between them. In order to increase the heat exchange, the tubes 134 support fins 138, 140. These fins 138, 140 can be placed one after the other according to the flow of air, so that they form "successive fins" according to this flow. The concentration of fins in the matrix 130 may vary. In the present matrix 130, there is shown a first succession with front fins 138 (shown in solid lines), and rear fins 140 (shown in dashed lines).

The front wings 138 are placed in a front plane, and the rear wings 140 are placed in the background.

The fins 138, 140 are offset from one plane to another plane. Offset means a variation of inclination, and/or a gap transversely to the flow of air. For example, two successive fins 138, 140 may each extend in the air-flow in a proper main direction. These main directions can be inclined relative to each other, in particular inclined by 90°. Seen from the front, the successive fins 138, 140 draw crosses, for example series of crosses connecting the tubes 134. Since the fins 138, 140 are inclined relative to the tubes 134, they form triangles, or struts.

The intersections 142 in the space of the successive fins 138, 140 is remote from the tubes 134, possibly halfway between two successive tubes 134. This central position of the intersections 142 avoids amplifying the losses in the boundary layers.

FIG. 5 also shows in a dotted line a housing 160. To avoid overloading the figure, only one housing 160 is shown. It is presented in this example in a tubular form. The housing can extend over the entire height of the matrix or only part of its height. The housing 160 is provided to accommodate heating elements to heat the oil in the tubes 134.

The matrix being made by additive manufacturing, there is no restriction on the tubular shape of the housing 160 due to constraining manufacturing process, as illustrated in FIG. 7.

FIG. 6 is a schematic isometric view of a portion of the matrix 130. It shows the cross flows of air and oil, respectively penetrating the corridors 136 and the tubes 134 (schematically represented). Housings 160 are shown, coaxial, on an upper face of the matrix. The invention is not limited to this embodiment and the skilled person would adapt the position, shape and orientation of the housing according to the needs for heating of the oil or according to the overall design of the surrounding exchanger elements. The housings 160 may be arranged in a network, for example in staggered rows. Heating rods 162 (one of which is shown in FIG. 6) are positioned in the housings 160.

FIG. 7 is a cross-section along the axis 7-7 plotted in FIG. 5. Due to this cross-section, the fins 138, 140 are visible only as halves.

Several successions of fins 138, 140 are shown one behind the other along the secondary flow 20. The fins 138, 140 extend from the walls 148 forming the tubes 134. They can form flat tabs. As is apparent here, the tubes 134 are staggered in the section and aligned according to the flow of secondary air 20. The walls 148 of the tubes 134 form the structure of the matrix 130, the exchange of heat happening through of their thicknesses. In addition, the tubes 134 may be partitioned by an inner wall 135, which increases their rigidity. Optionally, the interior of the tubes is embellished with obstacles (not shown) to generate vortexes in the oil in order to increase the exchange of heat.

The fins 138, 140 of the different fin planes can be spaced from the other fins, which reduces the mass and the occupation of the bushing. The front fins 138, 140 can join the upstream tubes, and the rear fins 140 join the tubes arranged downstream. This configuration makes it possible to connect the tubes 134 to each other, while allowing the passage of air in the passages 136 separating them.

The tubes 134 may have rounded profiles, for example ellipses. They are thinned transversely to the flow of air to reduce the pressure losses, and thus increase the possible flow. The tubes 134 placed in the extension of each other according to the flow of air are separated by the passages 136. Similarly, other passages 136 separate the superposed tubes. Since these passages 136 communicate with each other, the matrix is open through and through and the flow of air can flow in a straight line as well as diagonally with respect to the secondary flow 20. Two exemplary embodiments of the housings 160 are illustrated. They can connect the tubes 134 as zig-zag or in a straight line. The additive manufacturing makes it possible to obtain all kinds of geometries and when the housings 160 are zig-zag, flexible heating elements can be provided for installation. Some portions of the heating elements can also be introduced into the housing during manufacture.

FIG. 8 shows a matrix 230 of heat exchanger according to a further embodiment of the invention. This FIG. 8 repeats the numbering of the preceding figures for identical or similar elements, the numbering being incremented by 100. Specific numbers are used for the elements specific to this embodiment.

The matrix 230 is shown from the front, i.e. how the flow of the air meets the matrix when it enters the passage. The network forms a mesh 244, for example with paths connected to each other forming polygons. The mesh 244 may optionally form squares. The mesh 244 may surround channels 246 in which the air circulates. These channels 246 can be separated from each other by the mesh 244. The network comprises a wall 248 which marks the separation between air and oil. The heat exchange takes place through this wall 248. It also forms the structure of the matrix 230. Inside, the channels 246 are barred by successive fins 238, 240, preferably by several series of successive fins.

Three exemplary embodiments of the housings 260 are shown. These are in tubular form for receiving the heating elements. They are provided inside the oil passages 244, so as not to disturb the air flow in the passages 236.

As for FIG. 7, they can be linear or zig-zag. The housings 260 may be transverse (see dashed circle in FIG. 8).

FIG. 9 shows an enlargement of a channel 246 illustrative of those shown in FIG. 8.

The fins 238, 240 are located on the wall 248. They can connect the opposite faces of the wall. The fins 238, 240 may form crosses, for example by joining two coplanar and secant fins. In addition, the set of fins 238, 240 can form a succession of successive crosses. The different crosses are rotated relative to each other in order to optimize the heat exchange while limiting the losses of loads. For example, each cross is rotated 22.5 degrees from its upstream cross. A pattern with four crosses rotated regularly can be repeated. Optionally, the crosses form helical passages 236 within the channels 246, for example four helical passages 236 wound around each other. The channels 246 may be straight or twisted.

Figure 10:
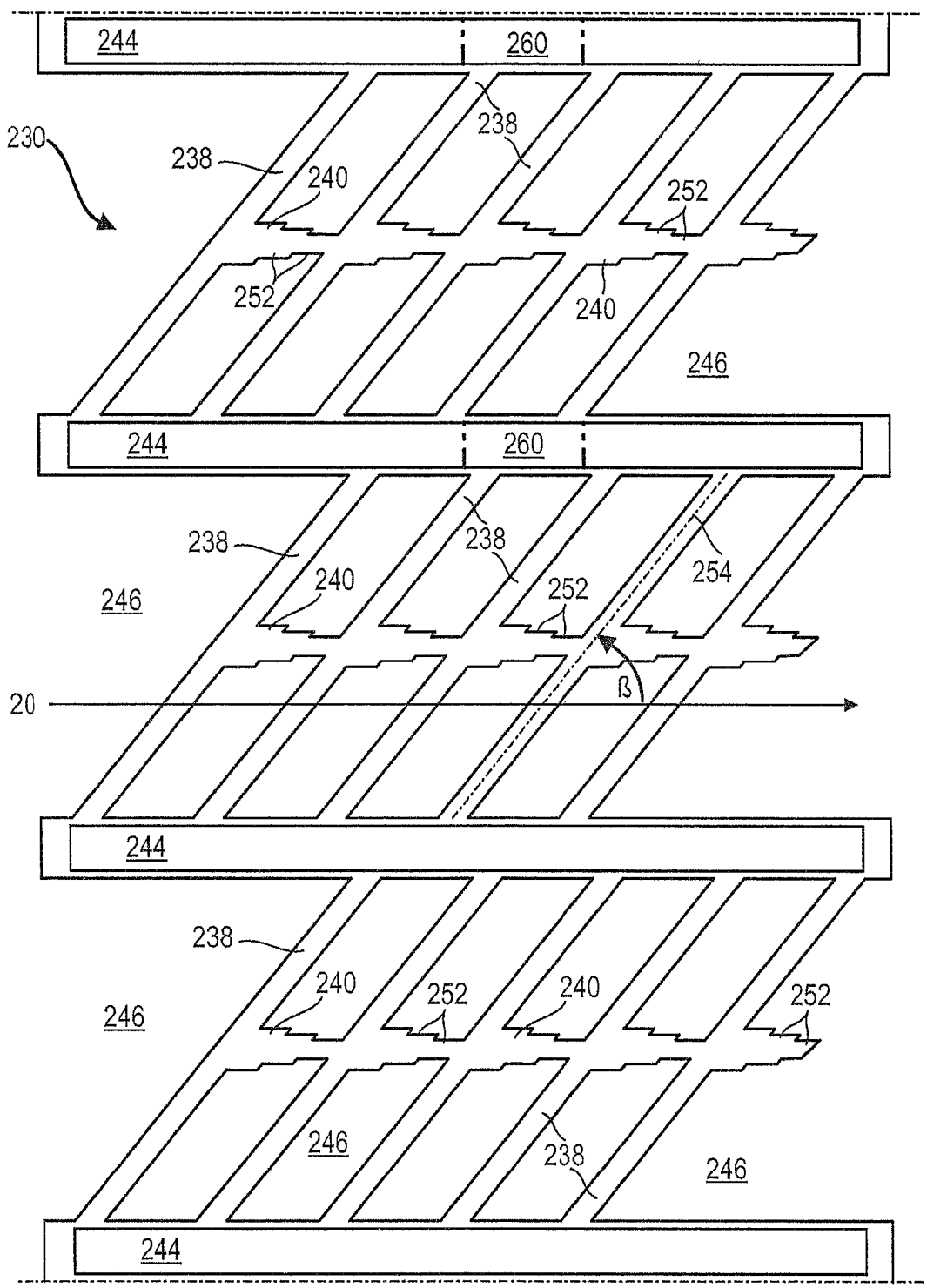
FIG. 10 is a section of the matrix of the second embodiment along the axis 10-10 drawn in FIG. 8.

FIG. 10 is a partial cross-section along the axis 10-10 shown in FIG. 8. Three channels 246 are shown, as well as four mesh portions 244 in which the oil flows. The fins 238, 240 and therefore the crosses that they form appear in cross-section. The front fins 238 are visible in all their lengths while the rear wings 240 are only partially visible since they remain in section. The following crosses are also partially represented via their hubs 252 crossing their fins.

The crosses are formed in planes. These planes are parallel to each other, and inclined relative to the secondary air flow 20. The angle of inclination β between the planes 254 of fins and the general flow of air can be between 30° and 60°. The angle of inclination β may be 45°. From this it follows that the passages 246 comprise sections inclined with respect to the general direction of the flow of air through the matrix 230. This arrangement causes the air to change directions as it circulates, and to better cool the offset fins.

Figure 11:
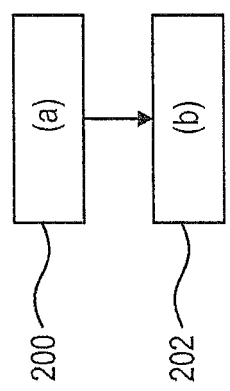
FIG. 11 is a diagram of the process for producing a heat exchanger matrix according to the invention.

FIG. 11 represents a diagram of a method of producing a heat exchanger matrix. The matrix produced may correspond to those described with reference to FIGS. 4 to 10.

The method may comprise the following steps, possibly carried out in the following order:

(a) design 200 of the matrix of the exchanger, the matrix comprising a one-piece body with successive fins;

(b) making the matrix 202 by additive manufacturing in a printing direction that is inclined relative to the main directions of the fins or each fin. This inclination can be between 30° and 50°.

The printing direction may be inclined relative to the tubes at an angle between 30° and 50°. The printing direction may also be substantially parallel to the channels, or inclined at less than 10°, or less than 4°.

The additive manufacturing can be made from powder, optionally from powder of titanium or of aluminum. The thickness of the layers of additive manufacturing may be between 20 microns and 50 microns, which makes it possible to achieve a fin thickness of the order of magnitude of 0.35 mm, and partitions/walls of 0.60 mm.

The collectors can be made of mechanically welded sheets, then welded to the ends of the matrix to form a collector.

The invention claimed is:

1. A system for an aircraft, the system comprising:
   a turbine engine with a hydraulic lubrication circuit; and
   a fuel cell with a hydraulic circuit in contact with the fuel cell for setting and maintaining the operating temperature of the fuel cell;
   wherein the hydraulic lubrication circuit and the hydraulic circuit form a single and common oil circuit and the oil circuit comprises:
   a pump with a heating element integrated in the pump for heating oil passing through the oil circuit.

2. The system of claim 1, wherein the pump comprises:
   a body made of a thermally conductive material such as an alloy of aluminum, silver, copper or zinc and forming the heating element.

3. The system of claim 1, further comprising:
   an oil tank in fluid communication with the oil circuit and the pump is embedded into the oil tank so that the heating element heats the oil in the oil tank.

4. The system of claim 1, further comprising:
   an oil tank in fluid communication with the oil circuit and the pump is in thermal contact with the oil tank so that the heating element heats the oil in the oil tank.

5. The system of claim 1, further comprising:
   an oil tank in fluid communication with the oil circuit, wherein the oil tank and the pump are embedded in a casing.

6. The system of claim 5, wherein the casing has a shape that allows it to be integrated in a cavity of a wing of the aircraft.

7. The system of claim 1, wherein the heating element is an induction heating element heating the oil of the oil circuit in a cavity of the pump.

8. The system of claim 1, further comprising:
   an oil tank in fluid communication with the oil circuit and comprising a ferromagnetic wall, such that the ferromagnetic wall is heated up by induction.

9. The system of claim 1, wherein the turbine engine comprises:
   a bleed air system;
   wherein the oil circuit comprises:
   a heat exchanger which exchanges heat with air of the bleed air system, so that air of the bleed air system heats up the oil of the oil circuit.

10. The system of claim 1, wherein the turbine engine comprises:
    a by-pass;
    wherein the oil circuit comprises:
    a heat exchanger which exchanges heat with air of the by-pass, so that air of the by-pass cools down the oil of the oil circuit.

11. The system of claim 1, wherein the turbine engine comprises:
    a bleed air system; and
    a by-pass;
    wherein the oil circuit comprises:
    a first heat exchanger which exchanges heat with air of the bleed air system and a second heat exchanger which exchanges heat with air of the by-pass, the system further comprising:
    valves and a control device to convey the oil at will through the first heat exchanger or the second heat exchanger depending on a temperature of the oil that is measured and a target temperature of the oil.

* * * * *